United States Patent [19]

McGough

[11] 4,160,136

[45] Jul. 3, 1979

[54] ANTI-VANDALISM ARRANGEMENT FOR PROTECTING THE TOUCH CALLING UNIT OF A COIN TELEPHONE

[75] Inventor: Gerald B. McGough, Huntsville, Ala.

[73] Assignee: GTE Automatic Electric Laboratories Incorporated, Northlake, Ill.

[21] Appl. No.: 909,739

[22] Filed: May 25, 1978

[51] Int. Cl.² .............................................. H04M 1/23
[52] U.S. Cl. ................................. 179/184; 179/90 K; 200/304; 200/340
[58] Field of Search ........... 179/184, 178, 179, 158 R, 179/90 K, 6.3 R; 200/333, 334, 304, 159 R, 340, DIG. 25

[56] References Cited

U.S. PATENT DOCUMENTS

| | | | |
|---|---|---|---|
| 3,445,610 | 5/1969 | Lind | 179/90 K X |
| 3,491,221 | 1/1970 | Zamarra | 200/168 |
| 4,037,067 | 7/1977 | Solomovitz | 179/184 |

Primary Examiner—Thomas W. Brown

[57] ABSTRACT

An arrangement for protecting the touch calling unit and associated pushbuttons of a coin telephone, wherein the arrangement consists of metal pushbuttons interchangeable with the touch calling units standard pushbuttons and a decorative shield plate. The pushbuttons include a rectangular operating member of a reduced size, extending from an upper section of each pushbutton. The shield plate includes protective collars, adapted to encompass the pushbutton operating member.

11 Claims, 4 Drawing Figures

ANTI-VANDALISM ARRANGEMENT FOR PROTECTING THE TOUCH CALLING UNIT OF A COIN TELEPHONE

BACKGROUND OF THE INVENTION

1. Field of the Invention

This invention relates to anti-vandalism protective devices for coin telephones, and more particularly to an arrangement for protecting the touch calling unit and associated pushbuttons of a coin telephone.

2. Description of the Prior Art

Existing coin operated telephones presently known, equipped with touch calling units, (pushbutton operated calling devices), utilize mounting techniques that allow the pushbuttons of the touch calling unit to protrude through the telephone housing or casing for access by the user. The touch calling unit is typically mounted within the casing at the front of the coin telephone and a hood assembly or impact resistant decorative plate mounted on the casing about the touch calling unit. These decorative plates though protecting against the vandalism of the internal parts of the coin telephone do not afford adequate protection to the pushbuttons of the touch calling unit. Consequently, many touch calling units have been damaged due to excessive mechanical shock applied to the pushbuttons. This damage occurs when either vandals or irate customers strike the pushbuttons with the handset of the telephone, causing excessive force to be transmitted to the spring contacts inside the touch calling unit. This excessive force, in turn, results in damaged springs that render the unit inoperative.

In the past, adapter plates have been designed to be mounted about the pushbuttons and on top of the decorative plate which effectively raises the level of the plane in which the pushbuttons are located thus minimizing the shock caused by striking the pushbuttons. Similarly, U.S. Pat. No. 3,491,221, to P. A. Zamara, teaches a shield plate which is mounted on the face of a pushbutton calling device to prevent the accidental slipping of the operator's finger from one button to an adjacent button. U.S. Pat. No. 4,037,067, to B. Solomovitz, teaches a protective anti-vandalism device for a pay telephone employing a rotary calling device which is mounted over the dial on the face of the pay telephone. These arrangements are costly in manufacturing labor needed to produce the adapter plates and to install. Additionally, since a broad face of the pushbuttons are still exposed, excessive shock force is still transmitted to the pushbuttons resulting in their damage.

Accordingly, it is an object of the present invention to provide a novel and improved means for protecting the touch calling unit and associated pushbuttons on a coin telephone.

SUMMARY OF THE INVENTION

In accomplishing the object of the present invention, there is provided as the environment, a telephone station apparatus including a touch calling unit of the type to which the invention is applied. The touch calling unit includes a cover having a plurality of apertures arranged in columns and rows, with guide collars encompassing each of the apertures. A frame is sandwiched between the cover and a base having a plurality of cavities in alignment and substantially the same size as the cover apertures. The touch calling unit is mounted internally within the casing of the telephone apparatus, which also includes apertures arranged in columns and rows of a size to accept the guide collars and of a width allowing a substantial portion of the guide collars to project out of the casing.

Each pushbutton, includes an upper section arranged in an L-shaped structure with a vertical portion forming an operating member and a horizontal portion forming a stop member. A top surface of the stop member is arranged as an inclined plane. A square lower section extends downward and includes a bore to accept a biasing spring. The biasing spring is adapted to bear against the base of the touch calling unit and bias the pushbutton upward. A flange is positioned, about the periphery of the pushbutton between the upper and lower sections, and arranged to engage various spring contacts and to actuate the appropriate switching contacts when the pushbutton is depressed. Each pushbutton is adapted to be slidably mounted within each cavity of the touch calling unit with each pushbutton operating member extending out of the top of a respective touch calling unit guide collar. It should be noted that the pushbuttons are adapted to replace the standard pushbuttons of a typical touch calling unit.

The shield plate includes apertures arranged in columns and rows of a size and shape to accept the pushbutton operating members. Protective walls encompass each aperture on the top surface of the shield plate and extend outward. A pair of longitudinal wall sections of the protective walls have a top surface concave in cross section. The bottom surface of the shield plate has recessed portions arranged in columns and rows in alignment with the shield plate apertures and of a size and depth as to accept within the recess the touch calling unit guide collars. An inclined planar surface is positioned within each recess between a corresponding shield plate aperture and a recess wall. The inclined surface is arranged to engage the top surface at the pushbutton stop member and to limit the extended position of each pushbutton. The shield plate is mounted on the telephone casing over the touch calling unit and pushbuttons and when fully seated and secured, the pushbutton's operating members extend out of the protective walls to a height equal to the distance required to operate each pushbutton.

The reduced operating face of each pushbutton and the shape of the protective collars of the shield plate effectively reduce the damage to pushbuttons or touch calling unit when a mechanical shock is applied from a broad instrument such as the telephone handset. Additionally, the shield plate serves as the decorative plate thus dispensing with the need for any extraneous add-on protective devices which may distract from the aesthetic design of the telephone instrument.

BRIEF DESCRIPTION OF THE DRAWINGS

A better understanding of the invention may be had from a consideration of the following detailed description taken in conjunction with the accompanying drawings in which.

PREFERRED EMBODIMENT OF THE INVENTION

Figure 1:
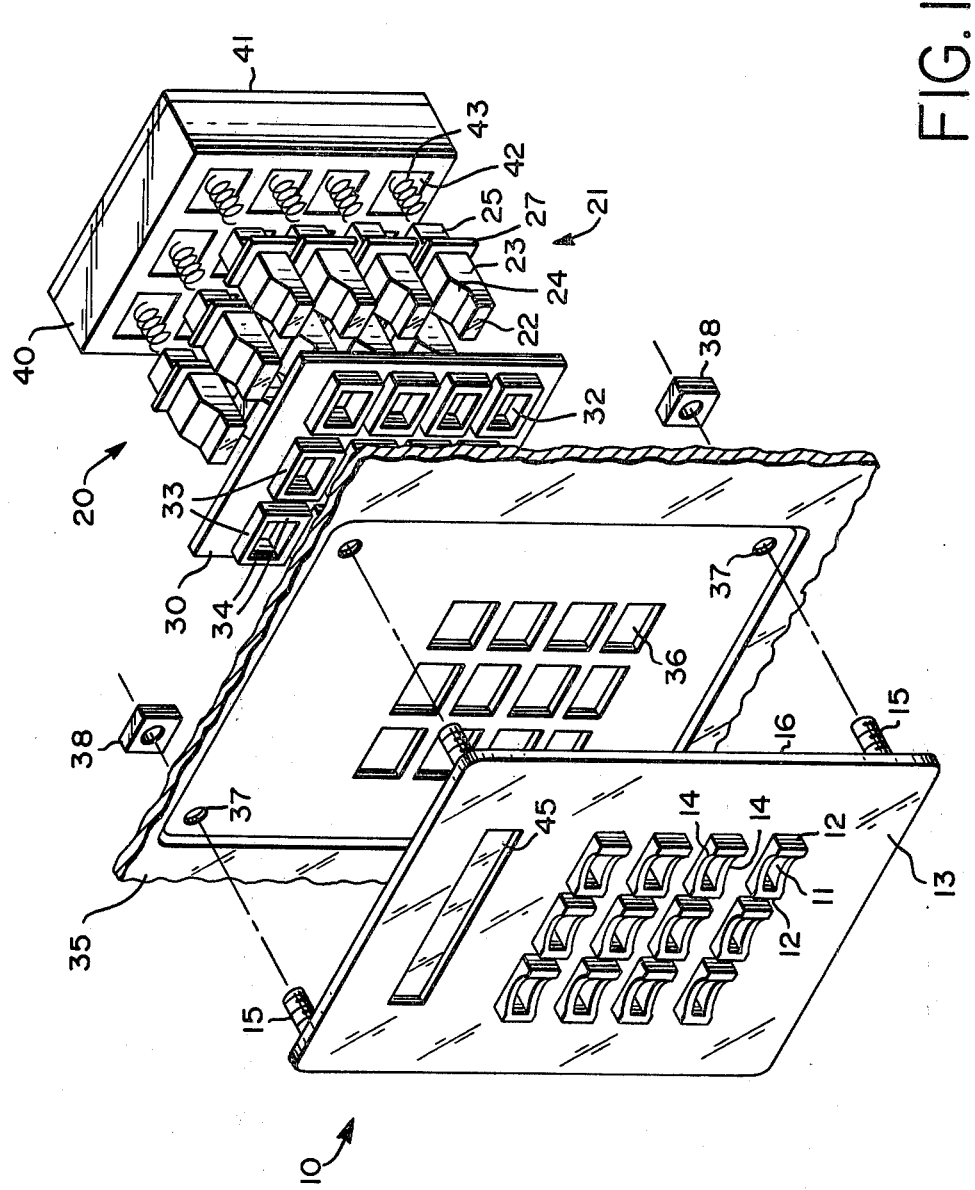
FIG. 1 is an exploded isometric view, of an arrangement for protecting the touch calling unit of a coin telephone in accordance with the present invention described herein.

Referring now to the accompanying drawings of the present invention, FIG. 1, shows the protective arrangement as including pushbuttons 20 and shield plate 10, arranged to be assembled with a typical touch calling unit including a frame 40, a cover 30 and installed on a telephone instrument casing 35, a portion of which is shown. It should be noted that frame 40, cover 30, and casing 35, illustrate the functional environment in this embodiment and form no part of the invention which will hereinafter be described in detail. The touch calling unit cover 30, includes a plurality of apertures therein arranged in columns and rows identical to the aperture shown as 32. Guide collars 33 encompass each aperture and extend perpendicular to the cover terminating in a planar top surface 34. The touch calling unit frame 40, is sandwiched between a base portion 41 and the cover 30. Frame 40 includes a plurality of cavities therein identical to that shown as 42 arranged in columns and rows in alignment and substantially the same size as cover apertures 32. The telephone casing includes a plurality of apertures therein arranged in columns and rows and identical to that shown as 36. Apertures 36 are of a size to accept therethrough guide collars 33 allowing a substantial portion of the guide collars 33 to project outward of the casing as shown on FIG. 3 and FIG. 4.

Figure 3:
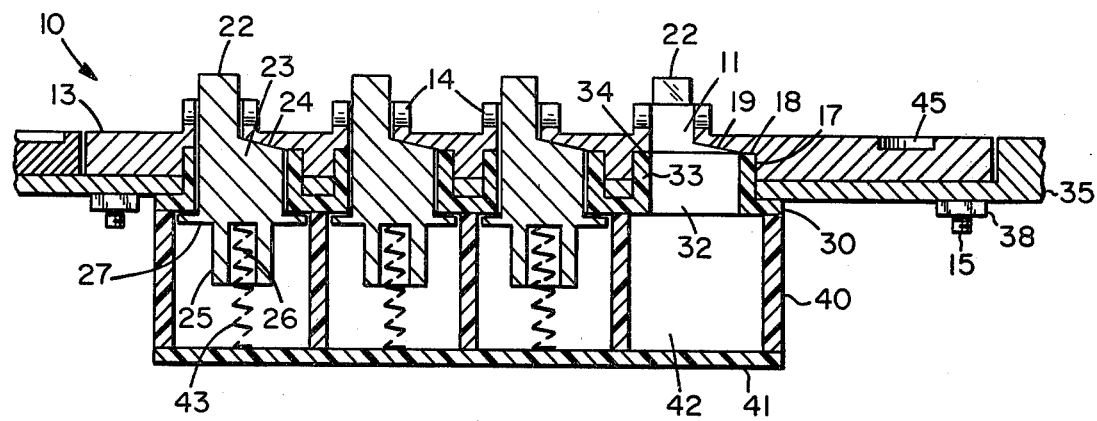
FIG. 3 is an enlarged sectional view, of the assembled arrangement shown in FIG. 2 and taken substantially along line A—A.

As seen best in FIG. 1 and FIG. 3 the pushbutton 20 in accordance with the present invention, is a one-piece unitary structure of metal alloy and includes an upper section 21 arranged in a L-shaped structure with a rectangular portion 22 forming an operating member and a square portion 23 forming a stop member. A top surface 24 of the stop member 23 is arranged as an inclined planar surface. A square lower section 25 extends downward from a portion of the upper section and includes a bore 26 to accept therein a biasing spring 43. The biasing spring 43 is adapted to bear against the base portion 41 and bias the pushbutton upwardly. A flange 27 is positioned, about the periphery of the pushbutton intermediate the upper section 21 and lower section 25 and arranged to engage various switching contacts (not shown) and to actuate the appropriate switching contacts when manual pressure is applied to the operating member and displaced downwardly. Each pushbutton 20 is adapted to be slidably mounted within each cavity 42 as shown on FIG. 3 and FIG. 4. It should be noted that the pushbutton 20 is adapted to replace the standard push-button of a typical touch calling unit.

Figure 2:
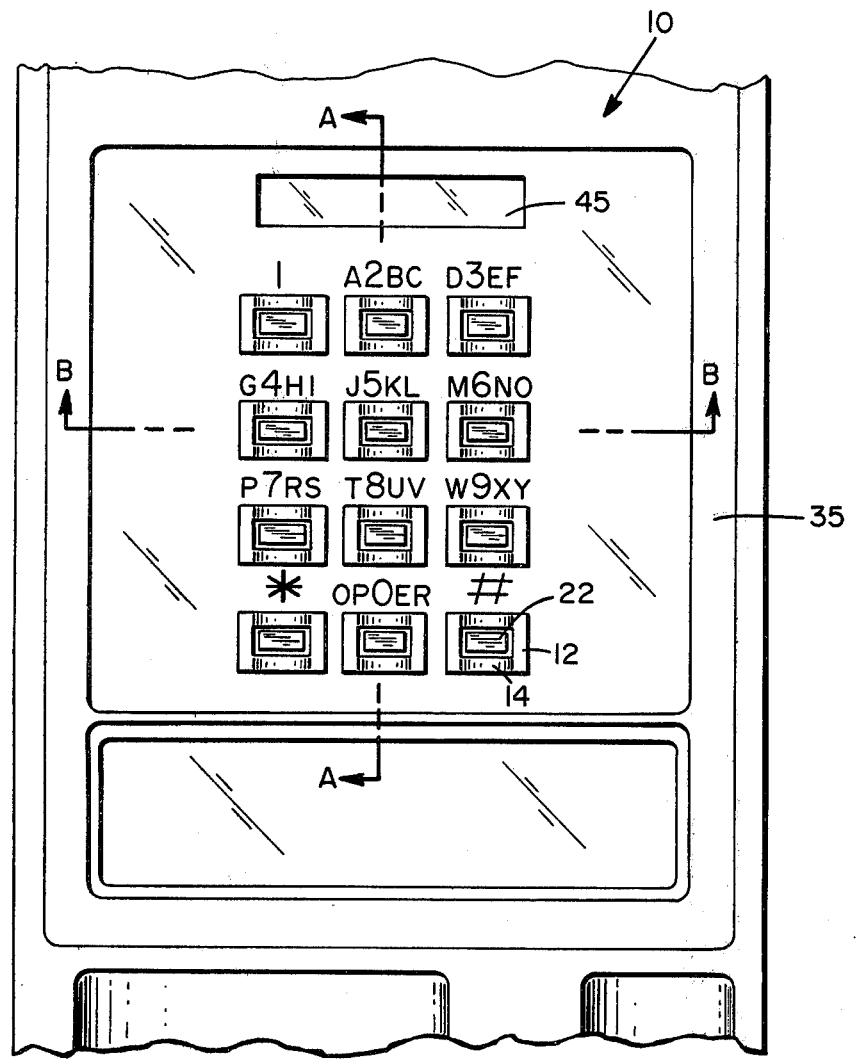
FIG. 2 is a front plan view, of the assembled arrangement, installed on the front of a coin telephone, portions of which are broken away.

The shield plate 10, of the present invention as shown in FIG. 1 and FIG. 2, is a planar panel composed of a metal alloy as a one-piece unitary structure and includes a plurality of rectangular apertures arranged in columns and rows identical to that shown as 11 adapted to accept within each aperture 11 a pushbutton operating member 22. Protective walls encompass each aperture 11 and are comprised of parallel side members 12 and parallel top and bottom members 14. The protective walls extend outward of the shield plate front surface 13 and terminate in a planar top surface. Central portions of the top and bottom members 14 top surface are oriented inwardly and form parallel arcuate surfaces.

Figure 4:
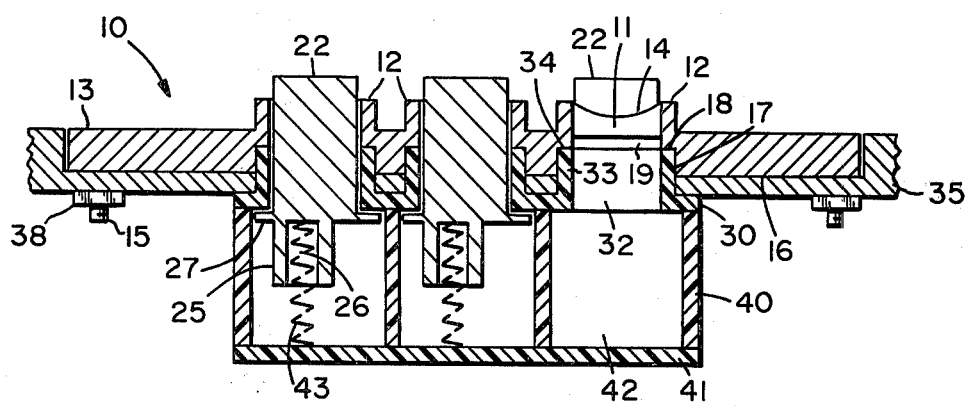
FIG. 4 is an enlarged sectional view, of the assembled arrangement shown in FIG. 2 and taken substantially along line B—B.

Referring now to FIGS. 3 and 4, the shield plate bottom surface 16, includes a plurality of recess portions arranged in columns and rows including walls 17 and shoulders 18 extending peripherally and defining each recess. Walls 17 are adapted to slidingly fit about guide collars 33 with the guide collars top surface 34 engaging shoulders 18. An inclined planar surface 19 is positioned within each recess between a corresponding aperture 11 and a recess wall 17. The inclined surface 19 is adapted to engage the top surface 24 of the pushbutton stop member 23 and to limit the extended position of each pushbutton. The shield plate 10 is mounted on the telephone casing by the use of threaded bolts 15, positioned perpendicular to the shield plate bottom surface 16 and disposed to be inserted through telephone casing mounting holes 37 and to engage corresponding threaded fastening devices 38 to secure the shield plate 10 on the telephone instrument casing 35, as shown on FIG. 1 and FIG. 3. When shield plate 10 is fully seated and secured, each pushbutton operating member 22 extends outward of the protective wall members 12 and 14 to a height equal to the distance required to operate each pushbutton as shown on FIG. 3 and FIG. 4. The arcuate top surfaces of protective wall members 14, allows the operators finger to depress the respective operating member 22 into the normal operating region required to engage the switch contacts.

Referring now to FIG. 2, the installed shield plate is shown on a typical coin telephone housing. Since the operating face of each pushbutton is reduced the normal indicia normally found on the face of each pushbutton is applied to the shield plate top surface 13 over each corresponding pushbutton. Additionally, a recessed index portion 45 is provided for the application of the telephone stations calling number.

The combination of reduced operating face of each pushbutton and protective collars of the shield plate effectively reduce the damage to the pushbuttons or the touch calling unit when a mechanical shock is applied from a broad instrument such as the telephone handset. The shield plate also serves as the decorative plate and is arranged to replace the standard decorative plate typically used with coin telephones. The shield plate may be painted or decorative appliques mounted thereon complementing the aesthetic design of the telephone instrument.

The present invention has been described with reference to a specific embodiment thereof, for the purpose of illustrating the manner in which the invention may be used to advantage, it will be appreciated by those skilled in the art that the invention is not limited thereto. Accordingly, any and all modifications, variations or equivalent arrangements which may occur to those skilled in the art should be considered to be within the scope of the invention.

What is claimed is:

1. Anti-vandalism means for use on a telephone station apparatus including an external casing, said casing including a plurality of apertures therein, a touch calling unit mounted internally within said casing and including guide collars each extending thru a different one of said apertures, and a plurality of cavities each in alignment with said guide collars, said anti-vandalism means comprising:

a plurality of pushbuttons each slidably mounted within one of said cavities and moveable between an extended position and a depressed position and normally biased toward said extended position, said pushbuttons each including an upper section, said upper section arranged in a L-shaped structure including a horizontal stop member having a top surface and an operating member vertically oriented and perpendicular to said stop member top surface extending outward from a portion of said upper section;

a shield plate including a plurality of apertures therein adapted to be mounted on said telephone station apparatus casing in alignment with said touch calling unit guide collars, said shield plate apertures including protective portions arranged to encompass each of said operating members and said operating members extending outward of said protective portions;

whereby said touch calling unit is operable by application of normal manual pressure to said operating members and said touch calling unit is protected from application of excessive mechanical pressure to said operating members.

2. Anti-vandalism means as recited in claim 1, wherein: said stop member top surface is arranged as an inclined plane.

3. Anti-vandalism means as recited in claim 1, wherein: said stop member further includes a bottom surface and said touch calling unit includes a base, said pushbutton including a lower section generally square in cross section and extending downwardly from a portion of said stop member bottom surface, said lower section including a bottom surface with a centrally located bore therein arranged to except within said bore a spring member, said spring member bearing against said touch calling unit base and biasing said pushbutton upwardly.

4. Anti-vandalism means as recited in claim 3, wherein: said pushbutton further includes a flange intermediate said upper section and said lower section extending peripherally of said pushbutton.

5. Anti-vandalism means as recited in claim 1, wherein: said pushbutton is a one-piece unitary structure composed of a rigid and inflexible material.

6. Anti-vandalism means as recited in claim 1, wherein: said shield plate includes a top surface and a bottom surface, said protective portions comprising a plurality of vertically oriented walls encompassing each of said shield plate apertures and extending outwardly from said top surface to a predetermined height, adapted to accept said pushbutton operating member therein, said operating member top surface extending outward of said walls to a predetermined height.

7. Anti-vandalism means as recited in claim 6, wherein: two of said plurality of walls, parallel and in spatial relation to each other include central portions of their walls oriented downwardly and generally concave in cross section.

8. Anti-vandalism means as recited in claim 6, wherein: said guide collars include a planar top surface, said shield plate bottom surface including planar portions arranged to be mounted on said telephone apparatus casing, and recessed portions encompassing each of said shield plate apertures forming shoulders therein, said recessed portions adapted to provide a slip fit over said guide collars, with said guide collars top surface engaging said shoulders.

9. Anti-vandalism means as recited in claim 8, wherein: said shield plate bottom surface includes a portion of said bottom surface adjacent to said shield plate apertures and encompassed by said shoulders arranged in an inclined planar surface adapted to engage said pushbutton stop member top surface and limit the extended position of said pushbutton.

10. Anti-vandalism means as recited in claim 6, wherein: said shield plate bottom surface further includes mounting means for rigidly fixing said shield plate to said telephone station apparatus casing.

11. Anti-vandalism means as recited in claim 1, wherein: said shield plate is a one-piece unitary structure composed of a rigid and inflexible material.

* * * * *